(12) United States Patent
Mihcak et al.

(10) Patent No.: US 7,657,752 B2
(45) Date of Patent: *Feb. 2, 2010

(54) DIGITAL SIGNAL WATERMAKER

(75) Inventors: M. Kivanc Mihcak, Urbana, IL (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 910 days.

This patent is subject to a terminal disclaimer.

(21) Appl. No.: 10/980,907

(22) Filed: Nov. 4, 2004

(65) Prior Publication Data

US 2005/0071377 A1 Mar. 31, 2005

Related U.S. Application Data

(63) Continuation of application No. 09/843,254, filed on Apr. 24, 2001, now Pat. No. 6,973,574.

(51) Int. Cl.
*H04L 9/00* (2006.01)

(52) U.S. Cl. .................. 713/176; 713/180; 382/100; 704/270

(58) Field of Classification Search .......... None
See application file for complete search history.

(56) References Cited

U.S. PATENT DOCUMENTS

| | | | |
|---|---|---|---|
| 4,773,039 A | 9/1988 | Zamora | |
| 5,093,869 A | 3/1992 | Alves et al. | |
| 5,210,820 A | 5/1993 | Kenyon | |
| 5,351,310 A | 9/1994 | Califano et al. | |
| 5,425,081 A | 6/1995 | Gordon et al. | |
| 5,465,353 A | 11/1995 | Hull et al. | |
| 5,490,516 A | 2/1996 | Hutson | |
| 5,535,020 A | 7/1996 | Ulichney | |
| 5,613,004 A | 3/1997 | Cooperman et al. | |
| 5,664,016 A | 9/1997 | Preneel et al. | |
| 5,687,236 A | 11/1997 | Moskowitz et al. | |
| 5,689,639 A | 11/1997 | Schwarz | |
| 5,734,432 A | 3/1998 | Netravali et al. | |
| 5,774,588 A | 6/1998 | Li | |
| 5,802,518 A | 9/1998 | Karaev et al. | |
| 5,809,498 A | 9/1998 | Lopresti et al. | |
| 5,835,099 A | 11/1998 | Marimont | |
| 5,862,260 A | 1/1999 | Rhoads | |
| 5,875,264 A | 2/1999 | Carlstrom | |
| 5,899,999 A | 5/1999 | De Bonet | |
| 5,915,038 A | 6/1999 | Abdel-Mottaleb et al. | |
| 5,918,223 A | 6/1999 | Blum et al. | |
| 5,953,451 A | 9/1999 | Syeda-Mahmood | |

(Continued)

FOREIGN PATENT DOCUMENTS

CN 1279849(A) 1/2001

(Continued)

OTHER PUBLICATIONS

Dittmann et al., "Content-based Digital Signature for Motion Pictures Authentication and Content-Fragile Watermarking", IEEE, 1999, Retrieved from the Internet on Jul. 27, 2008: <URL: http://ieeexplore.ieee.org/iel5/6322/16898/00778274.pdf?tp=&arnumber=778274&isnumber=16898>.*

(Continued)

*Primary Examiner*—Gilberto Barron, Jr.
*Assistant Examiner*—Minh Dinh
(74) *Attorney, Agent, or Firm*—Lee & Hayes, PLLC

(57) ABSTRACT

Described herein is a technology for facilitating the watermarking of digital signals. This abstract itself is not intended to limit the scope of this patent. The scope of the present invention is pointed out in the appending claims.

15 Claims, 9 Drawing Sheets

U.S. PATENT DOCUMENTS

| | | | |
|---|---|---|---|
| 5,983,351 A | 11/1999 | Glogau | |
| 6,075,875 A | 6/2000 | Gu | |
| 6,081,893 A | 6/2000 | Grawrock et al. | |
| 6,101,602 A | 8/2000 | Fridrich | |
| 6,131,162 A * | 10/2000 | Yoshiura et al. | 713/176 |
| 6,246,777 B1 | 6/2001 | Agarwal et al. | |
| 6,249,616 B1 | 6/2001 | Hashimoto | |
| 6,278,385 B1 | 8/2001 | Kondo et al. | |
| 6,314,192 B1 | 11/2001 | Chen et al. | |
| 6,321,232 B1 | 11/2001 | Syeda-Mahmood | |
| 6,330,672 B1 | 12/2001 | Shur | |
| 6,363,381 B1 | 3/2002 | Lee et al. | |
| 6,363,463 B1 | 3/2002 | Mattison | |
| 6,370,272 B1 | 4/2002 | Shimizu | |
| 6,377,965 B1 | 4/2002 | Hachamovitch et al. | |
| 6,385,329 B1 | 5/2002 | Sharma et al. | |
| 6,401,084 B1 | 6/2002 | Ortega et al. | |
| 6,418,430 B1 | 7/2002 | DeFazio et al. | |
| 6,425,082 B1 | 7/2002 | Matsui et al. | |
| 6,477,276 B1 | 11/2002 | Inoue et al. | |
| 6,513,118 B1 | 1/2003 | Iwamura | |
| 6,522,767 B1 | 2/2003 | Moskowitz et al. | |
| 6,532,541 B1 | 3/2003 | Chang et al. | |
| 6,546,114 B1 | 4/2003 | Venkatesan et al. | |
| 6,574,348 B1 | 6/2003 | Venkatesan et al. | |
| 6,574,378 B1 | 6/2003 | Lim | |
| 6,584,465 B1 | 6/2003 | Zhu et al. | |
| 6,625,295 B1 | 9/2003 | Wolfgang et al. | |
| 6,628,801 B2 | 9/2003 | Powell et al. | |
| 6,647,128 B1 | 11/2003 | Rhoads | |
| 6,654,740 B2 | 11/2003 | Tokuda et al. | |
| 6,658,423 B1 | 12/2003 | Pugh et al. | |
| 6,658,626 B1 | 12/2003 | Aiken | |
| 6,671,407 B1 | 12/2003 | Venkatesan et al. | |
| 6,674,861 B1 | 1/2004 | Xu et al. | |
| 6,687,416 B2 | 2/2004 | Wang | |
| 6,700,989 B1 | 3/2004 | Itoh et al. | |
| 6,701,014 B1 | 3/2004 | Syeda-Mahmood | |
| 6,725,372 B1 | 4/2004 | Lewis et al. | |
| 6,751,343 B1 | 6/2004 | Ferrell et al. | |
| 6,754,675 B2 | 6/2004 | Abdel-Mottaleb et al. | |
| 6,768,809 B2 | 7/2004 | Rhoads et al. | |
| 6,768,980 B1 | 7/2004 | Meyer et al. | |
| 6,769,061 B1 | 7/2004 | Ahern | |
| 6,771,268 B1 | 8/2004 | Crinon | |
| 6,782,361 B1 | 8/2004 | El-Maleh et al. | |
| 6,799,158 B2 | 9/2004 | Fischer et al. | |
| 6,839,673 B1 | 1/2005 | Choi et al. | |
| 6,864,897 B2 | 3/2005 | Brand | |
| 6,879,703 B2 | 4/2005 | Lin et al. | |
| 6,901,514 B1 | 5/2005 | Iu et al. | |
| 6,907,527 B1 | 6/2005 | Wu | |
| 6,965,898 B2 | 11/2005 | Aono et al. | |
| 6,971,013 B2 | 11/2005 | Mihcak et al. | |
| 6,973,574 B2 | 12/2005 | Mihcak et al. | |
| 6,990,444 B2 | 1/2006 | Hind et al. | |
| 6,990,453 B2 | 1/2006 | Wang et al. | |
| 6,996,273 B2 | 2/2006 | Mihcak et al. | |
| 7,062,419 B2 | 6/2006 | Grzeszczuk et al. | |
| 7,095,873 B2 | 8/2006 | Venkatesan et al. | |
| 7,142,675 B2 | 11/2006 | Cheng et al. | |
| 7,171,339 B2 | 1/2007 | Repucci et al. | |
| 2001/0010333 A1 | 8/2001 | Han et al. | |
| 2002/0126872 A1 | 9/2002 | Brunk et al. | |
| 2002/0154778 A1 | 10/2002 | Mihcak et al. | |
| 2002/0172394 A1 | 11/2002 | Venkatesan et al. | |
| 2002/0196976 A1 | 12/2002 | Mihcak et al. | |
| 2003/0056101 A1 | 3/2003 | Epstein | |
| 2003/0095685 A1 | 5/2003 | Tewfik et al. | |
| 2003/0118208 A1 | 6/2003 | Epstein | |
| 2003/0133591 A1 | 7/2003 | Watanabe et al. | |
| 2003/0169269 A1 | 9/2003 | Sasaki et al. | |
| 2003/0190054 A1 | 10/2003 | Troyansky et al. | |
| 2003/0219144 A1 | 11/2003 | Rhoads et al. | |
| 2004/0001605 A1 | 1/2004 | Venkatesan et al. | |
| 2004/0100473 A1 | 5/2004 | Grzeszczuk et al. | |
| 2005/0015205 A1 | 1/2005 | Repucci et al. | |
| 2005/0065974 A1 | 3/2005 | Mihcak et al. | |
| 2005/0071377 A1 | 3/2005 | Mihcak et al. | |
| 2005/0076229 A1 | 4/2005 | Mihcak et al. | |
| 2005/0084103 A1 | 4/2005 | Mihcak et al. | |
| 2005/0165690 A1 | 7/2005 | Liu et al. | |
| 2005/0180500 A1 | 8/2005 | Chiang et al. | |

FOREIGN PATENT DOCUMENTS

| | | |
|---|---|---|
| EP | 0581317 | 2/1994 |
| EP | 1253784 | 10/2002 |
| JP | 7239862 | 9/1995 |
| JP | 11-041571 | 2/1999 |
| JP | 11098341 | 4/1999 |
| JP | 2000050057 | 2/2000 |
| JP | 2000149004 | 5/2000 |
| JP | 2000261655 | 9/2000 |
| JP | 2000332988 | 11/2000 |
| JP | 2000350007 | 12/2000 |
| JP | 2000-004350 | 1/2001 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |

OTHER PUBLICATIONS

Lin et al., "Generating Robust Digital Signature for Image/Video Authentication", Sep. 1998, Retrieved from the Internet on Jul. 27, 2008: <URL: http://www.ee.columbia.edu/In/dvmm/publications/98/acmmm98.pdf>.*

Politis et al., "An Audio Signatures Indexing Scheme for Dynamic Content Multimedia Databases", Electrotechnical Conference, 2000. IEEE, vol. 2, May 29, 2000, pp. 725-728.

Venkatesan, et al., "Image Hashing", Microsoft Research, Mar. 24, 2000, pp. 1-8.

Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech , and Signal Processing, 2000. ICASSP '00. Proceedings. 2000 IEEE International Conference on June 5-9, 2000, Piscataway, NJ, USA, IEEE, vol. 6, pp. 2417-2420.

Pye, D., "Content-Based Methods for the Management of Digital Music", Acoustics, Speech , and Signal Processing, 2000. ICASSP '00. Proceedings. 2000 IEEE International Conference on June 5-9, 2000, Piscataway, NJ, USA, IEEE, vol. 6, pp. 2437-2440.

Chang et al., "A Spatial Match Representation Scheme for Indexing and Querying in Iconic Image Databases", 1997, ACM, Retrieved from the Internet http://portal.acm.org/citation.cfm?id=266890&coll=ACM&dl=ACM&CFID=68519948&CFTOKEN=85922645.

El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.

Lin et al., "A Robust Image Authentication Method Distinguishing JPEG Compression from Malicious Manipulation", IEEE Transactions, Feb. 2001, vol. 11, No. 2, pp. 153-168.

Schneider et al., "A Robust Content Based Digital Signature for Image Authentication". Proceedings, International Conference. Sep. 1996. vol. 3, pp. 227-230.

M. K. Mihcak and R. Venkatesan, "A tool for robust audio Information hiding: A perceptual audio hashing algorithm," submitted to Workshop on Information Hiding, Pittsburgh, PA. 2001.

T. Kalker and J. Haitsma, "Efficient detection of a spatial spread-spectrum watermark in MPEG video streams," Proc. IEEE ICIP. Vancouver, Canada, Sep. 2000.

I. J. Cox, J. Killian, T. Leighton, and T. Shamoon, "A secure robust watermark for multimedia," Information Hiding Workshop. Univerity of Cambridge, pp. 185-206, 1996.

J. Dittman, M. Stabenau and R. Steinmetz, "Robust MPEG video watermarking technologies," Proceedings of ACM International Multimedia '98, The 6th ACM International Multimedia Conference, Bristol, England, pp. 71-80.

M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.

F. A. P. Petitcolas and R. J. Anderson, "Evaluation of copyright marking systems," Proceedings of IEEE Multimedia Systems'99. vol. 1, pp. 574-579, Jun. 7-11, 1999, Florence, Italy.

B. Chen and G. W. Wornell, "Digital watermarking and information embedding using dither modulation," Proc. IEEE Workshop on Multimedia Signal Processing, Redondo Beach, CA, pp. 273-278, Dec. 1998.

B. Chen and G. W. Wornell, "Quantization Index Modulation: A class of Provably Good Methods for Digital Watermarking and Information Embedding," IEEE Trans. Inform. Theory, 1999 and 2000, pp. 1-54.

B. Chen and G. W. Wornell, "Dither modulation: a new approach to digital watermarking and information embedding," Proc. of SPIE: Security and Watermarking of Multimedia Contents, vol. 3657, pp. 342-353, 1999.

Echizen, Isao et al., "General Quality Maintenance Module for Motion Picture Watermarking", IEEE Transactions on Consumer Electronics, vol. 45, No. 4, Nov. 1999, 9 pages.

Takeuchi, Kazuki et al., "Image ID Extraction by Content Analysis and its Applications", Nov. 24, 2000, 8 pages.

"The Singular Value Decomposition", at <<http://www2.imm.dtu.dk/~pch/Projekter/tsvd.html>>, Aug. 20, 1999, pp. 3.

Mihcak et al., "Watermarking via Optimization Algorithms for Quantizing Randomized Statistics of Image Regions" Proceedings of the Annual Allerton Conference on Communication Control and Computing Urbana IL 2002 10 pages.

Moulin et al.,"The Parallel-Gaussian Watermarking Game" IEEE Transactions Information Theory Feb. 2004 pp. 1-36.

Chen et al.,"Quantization Index Modulation Methods for Digital Watermarking and Information Embedding of Multimedia" Journal of VLSI Signal Processing 27 2001 pp. 7-33.

Mihcak et al., "New Iterative Geometric Methods for Robust Perceptual Image Hashing" Proceedings of the Security and Privacy Digital Rights Management Workshop 2001 9 pages.

Kesal et al., "Iteratively Decodable Codes for Watermarking Applications" Proceedings of the Second Symposium on Turbo Codes and Their Applications France Sep. 2000 4 pages.

Venkatesan et al.,"Image Watermarking with Better Resilience" Proceedings of IEEE-ICIP Vancouver BC Canada 2000 4 pages.

Mihcak et al., "Cryptanalysis of Discrete-Sequence Spread Spectrum Watermarks" Proceedings of the Information Hiding Workshop Holland 2002 21 pages.

Mihcak et al., "Blind Image Watermarking Via Derivation and Quantization of Robust Semi-Global Statistics" Proceedings of IEEE-ICASSP Orlando FL 2002 4 pages.

Chen et al., "Achievable Performance of Digital Watermarking Systems" IEEE 1999 pp. 13-18.

Mihcak et al.,"A Perceptual Audio Hashing Algorithm: A Tool For Robust Audio Identification and Information Hiding" Proceedings of the Information Hiding Workshop 2001 15 pages.

Moulin et al.,"A Framework for Evaluating the Data-Hiding Capacity of Image Sources" IEEE Transactions on Image Processing vol. 11 No. 9 Sep. 2002 pp. 1-14.

Wu et al., Video Access Control Via Multi-level Data Hiding Proc. IEEE Int. Conf. on Multimedia and Expo vol. I Jul./Aug. 2000 pp. 381-384.

Lee et al., "Adaptive Video Watermarking Using Motion Information" Proc SPIE vol. 3971: Security and Watermarking of Multimedia Contents II Jan. 2000 pp. 209-216.

Echizen et al.,"General Quality Maintenance Module for Motion Picture Watermarking" IEEE Trans. on Consumer Electronics vol. 45 No. 4. Nov. 1999 pp. 1150-1158.

Chang, et al.; "RIME: A Replicated Image Detector for the World-Wide Web"; Department of Computer Science, Stanford University; vol. 3527; Nov. 2-4, 1998; pp. 58-67.

Henrique Malvar, "A Modulated Complex Lapped Transform and Its Applications to Audio Processing," IEEE ICASSP'99, Phoenix, Arizona Mar. 1999, pp. 1-4.

R. Venkatesan, S.-M. Koon, M.H. Jakubowski and P. Moulin, "Robust Image Hashing," Cryptography Group, Microsoft Research, 3 pages.

Cheng et al. "Aircraft identification based on the algebraic method" Hybrid Image and Signal Processing III, vol. 1702, Apr. 23, 1992, pp. 298-305.

Kozat S. S. et al., "Robust Preceptual Image Hashing Via Matrix Invariants" Image Processing, 2004. Oct. 24, 2004.

Muramatsu, Taichi et al., "A Sound Database System with Intuitive Retrieval Retrieved by Sound", Proceedings of the 1999 IEICE General Conference, Information System 2, Mar. 8, 2999, SMD-7, pp. 383 and 384.

Tsuji, Yasuhiro, et al., "Local Patterns of a Melody and its Applications to Retrieval by Sensitivity Words", IEICE Technical Report, Mar. 6, 1997, vol. 96, No. 565, SP96-124, pp. 17-24.

Yoshino, Taichi et al., "An Automatic Metadata Creation Method for Musci Data and its Application to Semantic Associative Search", Technical Report of Information Processing Society of Japan, Jul. 10, 1998, vol. 98. No. 58, 98-DBS-116, pp. 109 to 116.

Fridrich, et al., "Robust Hash Functions for Digital Watermarking" Proc. Int. Conf. on Information Technology: Coding and Computing Mar. 2000 pp. 178-183.

Brin, et al., "Copy Detection Mechanisms for Digital Documents", Proceedings of the ACM SIGMOD Annual Conference, San Jose, May 1995, pp. 398-409.

Fridrich, et al., "Robust Hash Functions for Digital Watermarking" Proc. Int. Conf. on Information Technology: Coding and Computing Mar. 2000 pp. 178-183.

"US ASCII Code Chart", 1968, Wikipedia.

* cited by examiner

DIGITAL SIGNAL WATERMAKER

RELATED APPLICATIONS

This application is a continuation of and claims priority to U.S. patent application Ser. No. 09/843,254, filed Apr. 24, 2001, the disclosure of which is incorporated by reference herein.

BACKGROUND

Digital audio signals offer many advantages over conventional media in terms of audio quality and ease of transmission. With the ever-increasing popularity of the Internet, digital audio clips have become a mainstay ingredient of the Web experience, buoyed by such advances as the increasing speed at which data is carried over the Internet and improvements in Internet multimedia technology for playing such audio clips. Everyday, numerous digital audio clips are added to Web sites around the world.

An audio "clip" indicates an audio signal (or bit stream), in whole or part. A clip may be stored and retrieved, transmitted and received, or the like.

As audio clip databases grow, the needs for indexing them and protecting copyrights in the audio clips are becoming increasingly important. The next generation of database management software will need to accommodate solutions for fast and efficient indexing of digital audio clips and protection of copyrights in those digital audio clips.

A hashing technique is one probable solution to the audio clip indexing and copyright protection problem. Hashing techniques are used in many areas such as database management, querying, cryptography, and many other fields involving large amounts of raw data. A hashing technique maps a large block of data (which may appear to be raw and unstructured) into relatively small and structured set of identifiers (the identifiers are also referred to as "hash values" or simply "hash"). By introducing structure and order into raw data, the hashing technique drastically reduces the size of the raw data into short identifiers. It simplifies many data management issues and reduces the computational resources needed for accessing large databases.

Thus, one property of a good hashing technique is the ability to produce small-size hash values. Searching and sorting can be done much more efficiently on smaller identifiers as compared to the large raw data. For example, smaller identifiers can be more easily sorted and searched using standard methods. Thus, hashing generally yields greater benefits when smaller hash values are used.

Unfortunately, there is a point at which hash values become too small and begin to lose the desirable quality of uniquely representing a large mass of data items. That is, as the size of hash values decreases, it is increasingly likely that more than one distinct raw data can be mapped into the same hash value, an occurrence referred to as "collision". Mathematically, for an alphabet of cardinality A of each hash digit and a hash value length l, an upper bound of all possible hash values is $A^l$. If the number of distinct raw data is larger than this upper bound, collision will occur.

Accordingly, another property of a good hashing technique is to minimize the probability of collision. However, if considerable gain in the length of the hash values can be achieved, it is sometimes justified to tolerate collision. The length of the hash value is thus a trade off with probability of collision. A good hashing technique should minimize both the probability of collision and the length of the hash values. This is a concern for design of both hashing techniques in compilers and message authentication codes (MACs) in cryptographic applications.

Good hashing techniques have long existed for many kinds of digital data. These functions have good characteristics and are well understood. The idea of a hashing technique for audio clip database management is very useful and potentially can be used in identifying audio clips for data retrieval and copyrights protection.

Unfortunately, while there are many good existing functions, digital audio clips present a unique set of challenges not experienced in other digital data, primarily due to the unique fact that audio clips are subject to evaluation by human listeners. A slight pitch or phase shifting of an audio clip does not make much difference to the human ear, but such changes appear very differently in the digital domain. Thus, when using conventional hashing functions, a shifted version of an audio clip generates a very different hash value as compared to that of the original audio clip, even though the audio clips sound essentially identical (i.e., perceptually same).

Another example is the deletion of a short block of time from an audio clip. If the deleted block is short and in an otherwise quiet portion of the clip, most people will not recognize this deletion in the audio clip itself, yet the digital data is altered significantly if viewed in the data domain.

Human ears are rather tolerant of certain changes in audio clips. For instance, human ears are less sensitive to changes in some ranges of frequency components of an audio clip than other ranges of frequency components. Human ears are also unable to catch small stretching and shrinking of short segments in audio clips.

Many of these characteristics of the human auditory system can be used advantageously in the delivery and presentation of digital audio clips. For instance, such characteristics enable compression schemes, like MP3, to compress audio clips with good results, even though some of the audio clip data may be lost or go unused. There are many audio clip restoration/enhancement algorithms available today that are specially tuned to the human auditory system. Commercial sound editing systems often include such algorithms.

At the same time, these characteristics of the human auditory system can be exploited for illegal or unscrupulous purposes. For example, a pirate may use advanced audio processing techniques to remove copyright notices or embedded watermarks from an audio clip without perceptually altering the audio clip. Such malicious changes to the audio clip are referred to as "attacks", and result in changes at the data domain.

Unfortunately, a human is unable to perceive these changes, allowing the pirate to successfully distribute unauthorized copies in an unlawful manner. Traditional hashing techniques are of little help because the original audio clip and pirated copy hash to very different hash values, even though the audio clips sound the same.

Common Attacks. The standard set of plausible attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3,
adaptive transform coding (ATRAC),
adaptive subband coding,
Digital Audio Broadcasting (DAB),
Dolby AC2 and AC3 systems,
applying additive or multiplicative noise, applying a second Embedded Signal, using the same system, to a single program fragment, frequency response distortion corresponding to normal analogue frequency response controls such as bass, mid and treble controls, with maximum variation of 15 dB with respect to the original signal, and applying frequency notches with possible frequency hopping.

Accordingly, there is a need for a hashing technique for digital audio clips that allows slight changes to the audio clip which are tolerable or undetectable (i.e., imperceptible) to the human ear, yet do not result in a different hash value. For an audio clip hashing technique to be useful, it should accommodate the characteristics of the human auditory system and withstand various audio signal manipulation processes common to today's digital audio clip processing.

A good audio hashing technique should generate the same unique identifier even though some forms of attacks have been done to the original audio clip, given that the altered audio clip is reasonably similar (i.e., perceptually) to a human listener when comparing with the original audio clip. However, if the modified audio clip is audibly different or the attacks cause irritation to the listeners, the hashing technique should recognize such degree of changes and produce a different hash value from the original audio clip.

SUMMARY

Described herein is a technology for facilitating the watermarking of digital signals. This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

FIGS. 3A-1 and 3A-1 illustrate the time-frequency representation and the significance map, respectively, of given audio clip.

FIGS. 3B-1 and 3B-1 illustrate the time-frequency representation and the significance map, respectively, of another audio clip.

DETAILED DESCRIPTION

The following description sets forth one or more specific embodiments of an recognizer of audio-content in digital signals that incorporate elements recited in the appended claims. These embodiments are described with specificity in order to meet statutory written description, enablement, and best-mode requirements. However, the description itself is not intended to limit the scope of this patent.

Described herein are one or more exemplary implementations of a method and system of fusing portions of a print medium. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An exemplary embodiment of an recognizer of audio-content in digital signals may be referred to as an "exemplary audio recognizer."

INCORPORATION BY REFERENCE

The following co-pending patent applications are incorporated by reference herein (which are all assigned to the Microsoft Corporation):

U.S. patent application Ser. No. 09/390,271, entitled "A Technique for Watermarking an Image and a Resulting Watermarked Image" filed Sep. 7, 1999;

U.S. patent application Ser. No. 09/390,272, entitled "A Technique for Detecting a Watermark in a Marked Image" filed on Sep. 7, 1999;

U.S. patent application Ser. No. 09/316,899, entitled "Audio Watermarking with Dual Watermarks" filed on May 22, 1999;

U.S. patent application Ser. No. 09/614,660, entitled "Improved Stealthy Audio Watermarking" filed on Jul. 12, 2000;

U.S. patent application Ser. No. 09/843,234, entitled "Robust Recognizer of Perceptually Similar Content" filed on Apr. 24, 2001;

U.S. patent application Ser. No. 09/843,279, entitled "Derivation and Quantization of Robust Non-Local Characteristics for Blind Watermarking" filed on Apr. 24, 2001;

U.S. patent application Ser. No. 09/259,669, entitled "A System and Method for Producing Modulated Complex Lapped Transforms" filed on Feb. 26, 1999; and U.S. patent application Ser. No. 09/421,986, entitled "System and Method for Hashing Digital Images" filed on Oct. 19, 1999.

The following U.S. patent is incorporated by reference herein: U.S. Pat. No. 6,029,126, entitled "Scalable Audio Coder and Decoder" issued on Feb. 22, 2000, and assigned to the Microsoft Corporation.

Introduction

Figure 9:
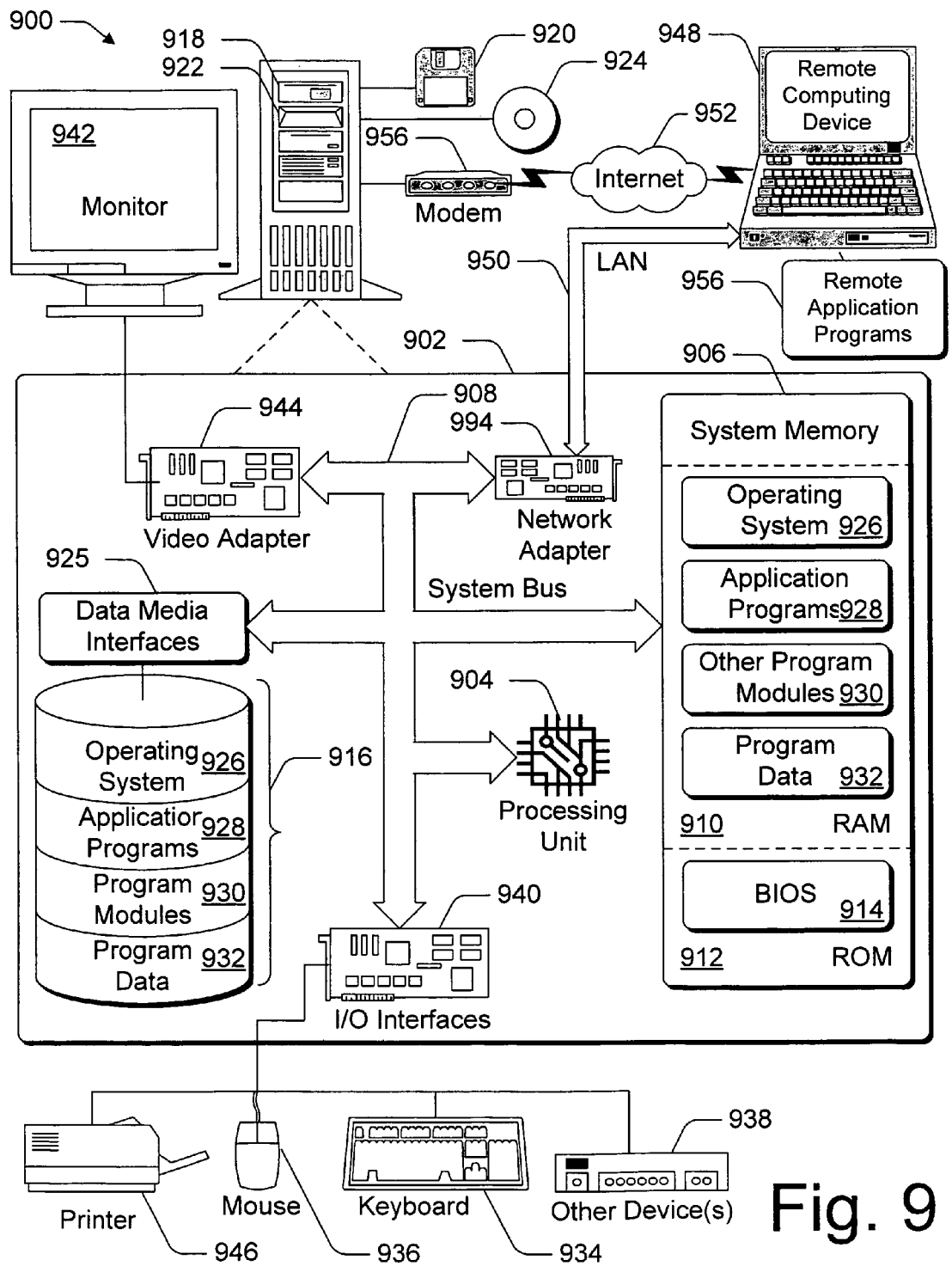
FIG. 9 is an example of a computing operating environment capable of implementing an implementation of the present invention claimed herein.

Implementations, described herein, of the exemplary audio recognizer may be implemented (whole or in part) by an audio-content recognition system 100 and/or by a computing environment like that shown in FIG. 9.

An exemplary implementation is described herein as a technique for generally recognizing audio content of digital audio signals by hashing such signals to generate one or more hash values for each signal.

An exemplary implementation is described herein as a technique for identifying audio content of such signals by comparing identification hash values of signals. This exemplary implementation generates the same unique identifier (e.g., hash value) even though some forms of attacks have been done to the original digital audio signal, given that the altered signal is perceptually same to a human listener when comparing the altered signal with the original signal. However, if the altered signal is perceptually audibly different or the attacks cause irritation to the listeners, the hashing technique recognizes such degree of changes and produces a different hash value from the original signal.

An exemplary implementation is described herein as a technique for categorizing audio content of such signals by comparing categorization hash values of signals.

An exemplary implementation described herein is a technique that may be combined with techniques described in documents which are incorporated herein by reference.

Exemplary Applications

Implementations, described herein, of the exemplary audio recognizer are suitable for numerous applications, including the following (which are provided as examples and not as limitations): identification, searching & sorting in a database, semantic content categorization, and anti-piracy applications (such as watermarking). Some of the exemplary applications are discussed below:

Locating content in a database. Identification hash values may be stored and associated with specific audio content of a digital audio signal. When searching for such content, a search engine may look for a given hash value to locate the content. This is much more efficient that conventional techniques for searching for audio content in a database.

Semantic content categorization. This includes approximate matching of content between two digital audio signals. The hashing techniques of the exemplary embodiments have an intermediate hash value, which can be used to compare if two given items are similar. This hash value may also be called a categorization hash value.

This categorization hash value may be used to semantically classify audio content of audio works. Works of a similar nature tend to have categorization hash values that cluster together. Thus, these values are proximally near each other. This proximal range may be subjectively determined. For some semantic categories, the range may be large and for others it may be small.

The categorization hash can be computed incrementally. This means that if the exemplary embodiment may slide the window of the audio clip, one may compute the hash value on the new window from the old window without doing substantial reworking on the part that is common to old and new windows.

Anti-piracy search efforts. One may search for the pirated content of audio signals on the web, which might have been subjected to watermarking and/or malicious attacks, using a web crawler and a database of signal hash values.

Content dependent key generation (for watermarks): Since the watermarking technique must use secret keys, using the same key for millions of pieces of content may compromise the key. Thus, an exemplary embodiment may generate a hash value for an audio signal that may function as signal dependent keys. For an attacker without the knowledge of the secret key used, the hash value of a given content will be unpredictable.

Hashing

The use of hashing techniques, which map long inputs into short random-looking (i.e., uniformly distributed) outputs, are many and indeed wide-ranging: compilers, checksums, searching and sorting techniques, cryptographic message authentication, one-way hashing techniques for digital signatures, time stamping, etc. These techniques usually accept binary strings as inputs and produce a fixed length ("L") hash value. These techniques use some form of random seeds (i.e., keys).

The hash values produced by such techniques are viewed as useful because they typically have following desirable characteristics:

Almost Uniformly Distributed—For any given input, the output hash value are uniformly distributed among the possible L-bit outputs.

Approximate Pairwise Independent—For two distinct inputs, the corresponding outputs are statistically almost independent of each other.

The hashing technique implemented by various systems and methods, described herein, is denoted as H. Given an input signal I, the hashing technique H produces a short binary string X, as follows:

$$H(I)=X$$

The hashing technique H has the following properties:

For any signal $I_i$, the hash of the signal, $H(I_i)$, is approximately uniformly distributed among binary strings of equal length.

For two distinct signals, $I_1$ and $I_2$, the hash value of the first signal, $H(I_1)$, is approximately independent of the hash value of the second signal, $H(I_2)$, in that given $H(I_1)$, one cannot predict $H(I_2)$.

If two signals $I_1$ and $I_2$ are perceptually the same or similar, the hash value of the first signal, $H(I_1)$, should equal the hash value of the second signal, $H(I_2)$.

The hashing techniques of the implementations, described herein, are similar in many respects to the hashing techniques described in some of the documents which are incorporated herein by reference. The hashing techniques, described herein, are particularly tailored to accommodate characteristics of the human auditory system and withstand various audio signal manipulation processes common to today's digital audio signal processing.

Perceptually Same and Perceptually Distinct

The exemplary audio recognizer treats two "perceptually same" audio signals as the same. Herein, a pair of digital audio signals are "perceptually same" when their identification hash values are the same (alternatively, substantially the same).

"Perceptually same" audio signals include those that sound as if they are they are substantially same to the human ear. As a first step in determining what it means to be perceptually same, one can use the standard Turing test used for formulating, for example, pseudo-randomness in cryptography. A listener is played two audio clips, one after another. Then the clips are played in random order and the listener should match up the clips. If the listener has no better than roughly a fifty-percent chance, the clips can be deemed perceptually same.

However, the use of the term is more general than that defined by the Turing test. Clips that have passed the Turing test may still be considered perceptually same when the listener is able to distinguish them only based on "slight and insubstantial differences." Regardless of such slight and insubstantial differences, the listener can clearly state that these clips "are the same audio clips for all practical purposes."

In contrast, a "perceptually distinct" digital goods is generally the converse of "perceptually same" digital goods. This may also be called "perceptually different" or "perceptually distinguishable".

Perceptually Similar

The exemplary audio recognizer treats two "perceptually similar" audio signals as different signals that should be categorized as similar. Herein, a pair of digital audio signals are "perceptually similar" when their categorization hash values are close in value (i.e., proximal). Signals that are "perceptually similar" may also be "perceptually same" if their identification hash values are the same.

Exemplary Hashing Technique of the Exemplary Implementations

The hashing technique of the exemplary implementations is an irreversible hashing function that operates on audio clips and yields a final hash value of a binary string of specified length. It also yields one or more intermediate has values. The hashing techniques of the exemplary implementations have the following criteria:

- The hash values are almost uniformly distributed with high probability.
- With high probability, the hash values for "perceptually audibly distinct" audio clips are different.
- With high probability, the hash values for "perceptually audibly same" audio clips are the same.

Assume X denotes a particular audio clip, X' denotes a modified version of this clip which is "perceptually same" as X, and Y denotes a "perceptually distinct" audio clip. Assume L is the final length of the hash and H(.) represents a hashing function. The following is a performance measure on the hash values that are produced:

$$D(H(X), H(Y)) \triangleq \frac{\sum_{i=1}^{L} H(X_i) \otimes H(Y_i)}{L} \quad (1)$$

where $H(X_i)$ and $H(Y_i)$ are the values of $H(X)$ and $H(Y)$ respectively at the $i^{th}$ location, and $\otimes$ stands for the XOR operation. Formula 1 is the ratio of the number of locations where H(X) and H(Y) are different to the total length of the hash.

The following are examples of a family of hashing functions, for use with the exemplary embodiments, with parameters: p, L (where $p \approx \frac{1}{2^L}$).

Randomization:

$$Pr[H(X) = \alpha] = p \approx \frac{1}{2^L}, \forall \alpha \in \{0, 1\}^L,$$

Perceptually distinct audio clips X, Y:

$$Pr[H(X)=\alpha|H(Y)=\beta] \approx Pr[H(X)=\alpha], \forall \alpha, \beta \in \{0,1\}^L,$$

Thus, H(X) is not equal to H(Y), with overwhelming probability

Perceptually same audio clips:

$$Pr[H(X)=H(X')] \approx 1.$$

Therefore, apart from the randomization issue, the difference between identification hash values of audio clips may be represented as follows:

$$D(H(X),H(X'))=0, D(H(X),H(Y))>0, \quad (2)$$

for all possible different ("perceptually distinct") audio clips X, Y and for all possible "perceptually same" audio clips X, X'.

Intermediate hash value. In the exemplary embodiments described herein, an intermediate hash value is calculated before the final (i.e., identification) hash value is calculated. The intermediate hash values are of length M, where M>L and have the following separation property:

$$D(H(X),H(X'))<0.2, D(H(X),H(Y))>0.40, \quad (3)$$

In the exemplary embodiments, M has a value within range of 5 L to 10 L. To determine the intermediate hash value, decoding stages of first order Reed-Müller codes employed with a specialized pseudo-norm. Given the intermediate hash, the exemplary embodiment uses some generic techniques (e.g., list-decoding procedures) to generate a binary string with desired properties.

For more information on generating intermediate hash values, see U.S. patent application Ser. No. 09/843,234, entitled "Robust Recognizer of Perceptually Similar Content" filed on Apr. 24, 2001.

Exemplary Audio Recognizer

Figure 1:
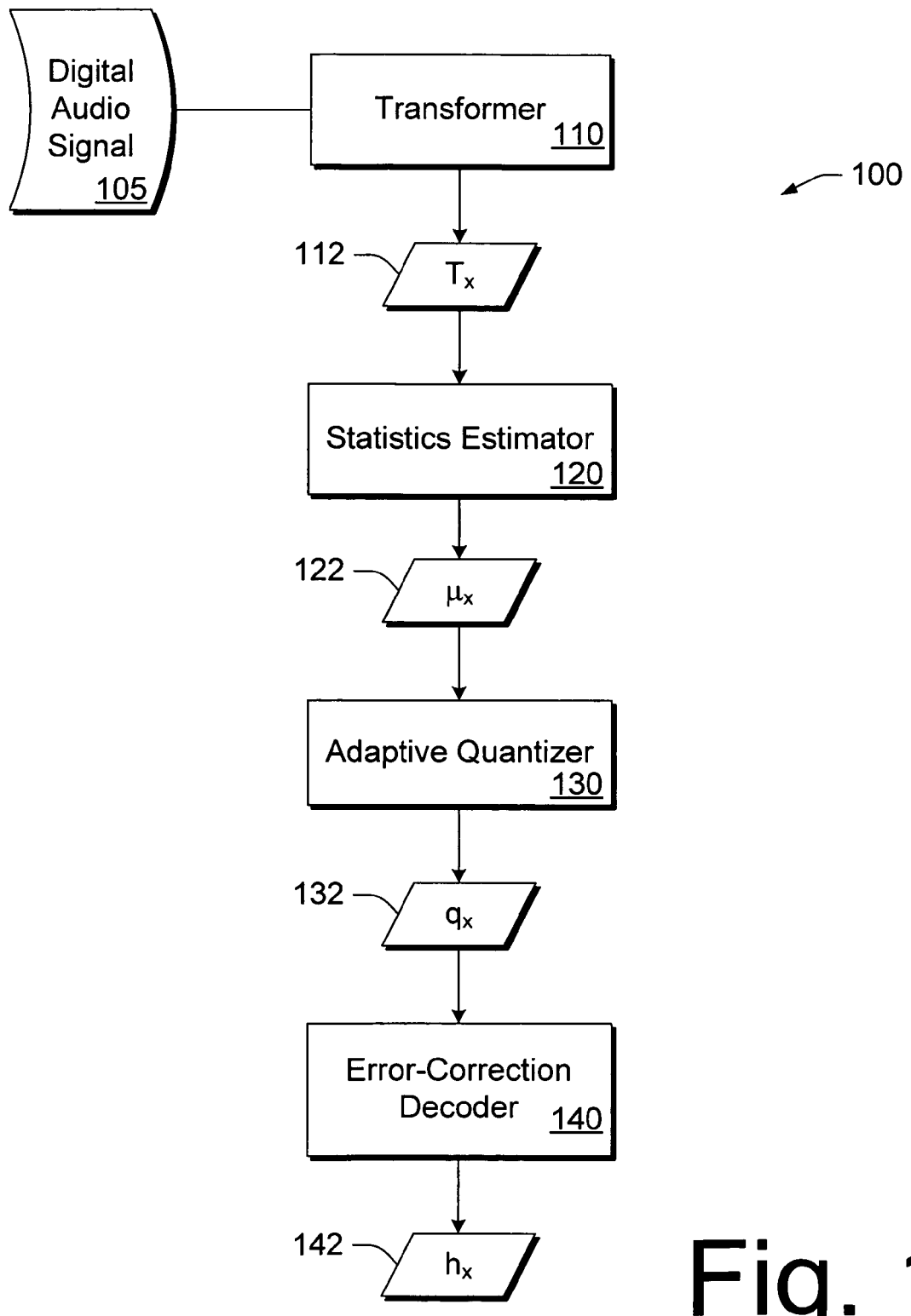
FIG. 1 is a schematic block diagram showing an embodiment of an implementation of the present invention claimed herein.

FIG. 1 shows the audio-content recognition system 100, which is an example of an embodiment of the exemplary audio recognizer. The system 100 includes a transformer 110, a statistics estimator 120, an adaptive quantizer 130, and an error-correction decoder 140.

The transformer 110 obtains a digital audio signal 105 (such as an audio clip). It may obtain the signal from nearly any source, such as a storage device or over a network communications link. The transformer 110 puts the signal 105 in canonical form using a set of transformations. Specifically, the exemplary audio recognizer employs MCLT (Modulated Complex Lapped Transform) and obtain time-varying spectral characteristics, $T_x$ 112, of the audio clip.

The statistics estimator 120 applies a randomized interval transformation in order to extract audible statistics, $\mu_x$ 122, of the signal. These audible statistics are expected to represent the audio signal in an irreversible manner while introducing robustness against attacks. For perceptually same audio clips, these statistics are likely to have close values (under suitable notions of metric) whereas for perceptually distinct audio clips they are far apart.

The adaptive quantizer 130 applies randomized rounding (i.e., quantization) to the outputs of the statistics estimator 120. The adaptive quantizer produces outputs, $q_x$ 132, that are represented as binary vectors. Alternatively, the quantizer 130 may be non-adaptive.

The error-correction decoder 140 uses the decoding stages of an error correcting code to map similar values to the same point. The final output, $h_x$ 142, is produced by the decoder 140. This final output is the final hash value. The decoder also produces an intermediate hash value. Alternatively, error-correction decoder 140 may be a randomized Vector Quantizater (VQ) or list-decoder, or other similar devices.

The decoder 140 produces intermediate hash values such that the normalized Hamming distance between intermediate hash values of perceptually distinct audio signals is greater than 0.40 and the normalized Hamming distance between intermediate hash values of perceptually similar audio signals is less than 0.20. Of course, these ranges are provided as examples only and not for limitation.

Each of aforementioned components of the audio-content recognition system 100 of FIG. 1 is explained in greater detail below.

The Transformer 110 and MCLT

MCLT is a complex extension of MLT (Modulated Lapped Transform).

MLT was introduced in and is used in many audio-processing applications, such as Dolby AC-3, MPEG-2. MCLT basis functions are found in pairs to produce real and complex parts separately. These basis functions are derived from MLT and they are phase-shifted versions of each other. It can be shown that they possess some intuitively pleasing properties such as perfect reconstruction and approximate shift invariance. The MCLT is a special case of 2× oversampled DFT (Discrete Fourier Transform) filter bank.

The MCLT is discussed more fully in U.S. patent application Ser. No. 09/259,669, entitled "A System and Method for Producing Modulated Complex Lapped Transforms," which is incorporated by reference herein.

Figure 2A:
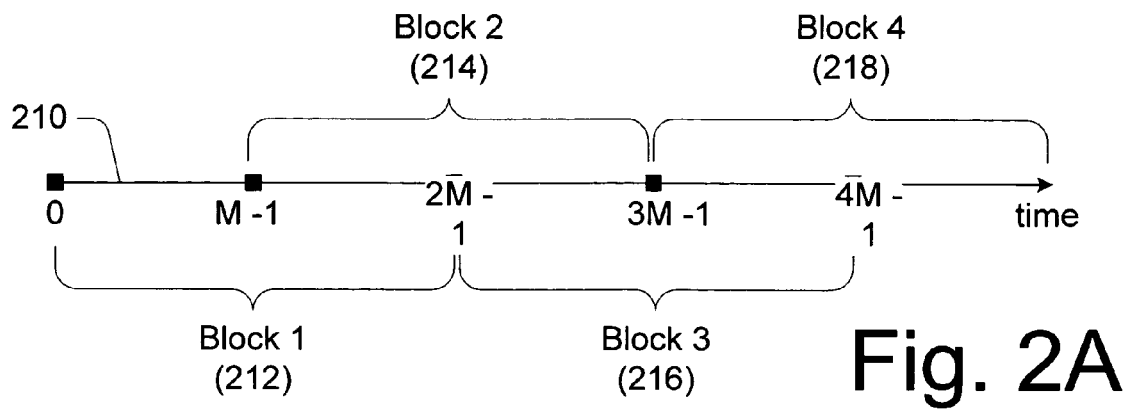
FIGS. 2A-2C illustrate an implementation of the MCLT transform in accordance with an implementation of the present invention claimed herein.
Figure 2B:
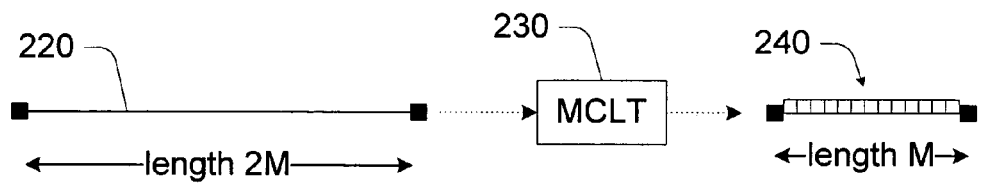
Figure 2C:
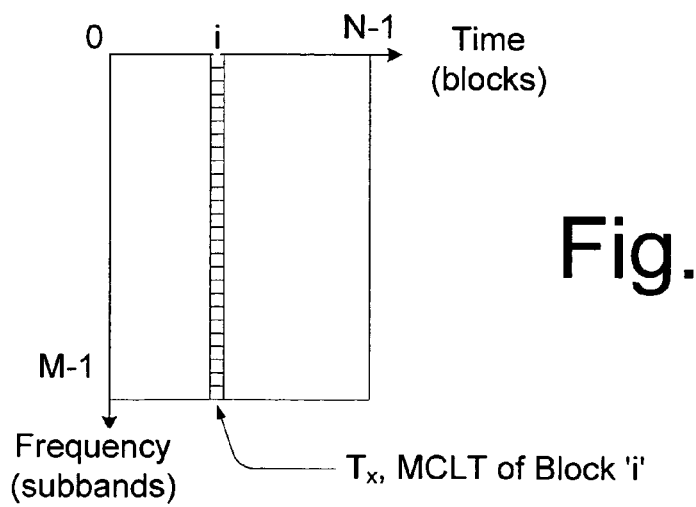

FIGS. 2A-2C illustrate the MCLT scheme, like the one employed by the transformer 110 of the audio-content recognition system 100 of FIG. 1. FIG. 2A shows a timeline 210 of an input sequence of an audio signal (which is not shown). The sequence is broken into overlapping "blocks" (blocks 212-218) along the timeline, so that neighboring blocks intersect by half.

As shown in FIG. 2B, the MCLT transform is applied, by MCLT transformer 230, applied independently to each block (such as block "i") to produce spectral decomposition of size M. Assuming that the analysis and synthesis filters are of length 2M, then the number of the frequency bands is M in the spectral domain.

FIG. 2C represents the combination of the spectral decomposition of the blocks in order to form the time-frequency decomposition, $T_x$. The MCLT transform of the blocks are combined into a matrix to obtain the time-frequency representation of an audio clip. For FIG. 2C, Let M be the number of frequency bands and N be the number of the blocks and T, is the MCLT matrix and $T_x(i, j)$ is the MCLT value at location $(i, j)$ where $j=0, 1, \ldots, N-1$.

MCLT can be used to define a "hearing threshold matrix" $H_x$, which is the same size as TX, such that if $T_x(i, j) >= H_x(i, j)$, then $T_x(i, j)$ is audible.

Randomized Interval Transformation (Statistics Estimation)

The following is the definition of the significance map $S_x$: $S_x(i,j)=1$, if $T_x(i,j) >= H_x(i,j)$; otherwise $S_x(i,j)=0$; where $i=0, 1, \ldots, M-1$ and $j=0, 1, \ldots, N-1$.

Figures 1, 3A:
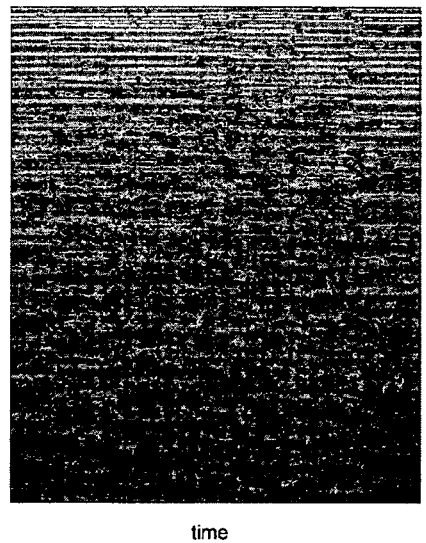
Figures 2, 3A:
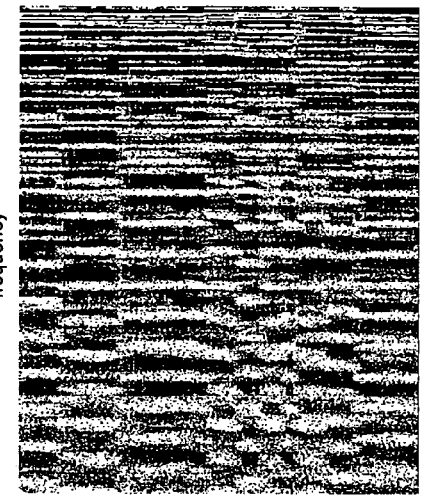
Figures 1, 3B:
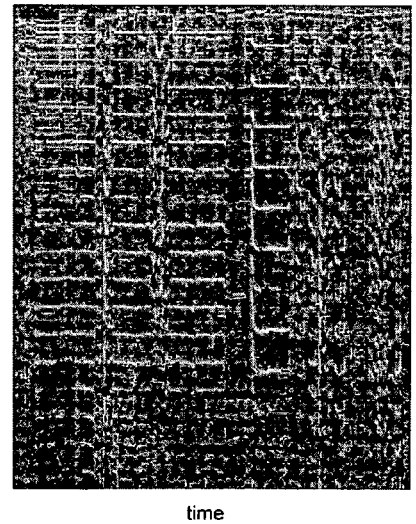
Figures 2, 3B:
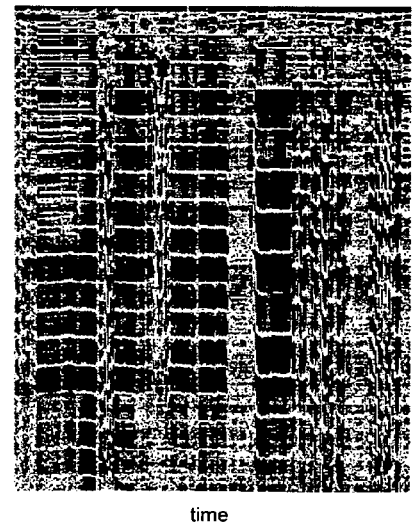

FIGS. 3A-1 and 3A-2 illustrate the time-frequency representation and corresponding significance map for an exemplary audio clip A. FIGS. 3B-1 and 3B-2 illustrate the time-frequency representation and corresponding significance map for a different exemplary audio clip, clip B. Only the low-frequency portions of the time-frequency representations and the significance maps are depicted in these figures for the purposes of convenience.

As shown in FIGS. 3A-1 and 3B-1, there is a striking pattern in time-frequency representation of the audio clips. Furthermore, this pattern has a slowly varying structure—with respect to both time and frequency. The exemplary audio recognizer captures this existing structure in a compact fashion via randomized interval transformations (i.e., "statistics estimation").

The statistics estimator 120 estimates statistics reflect characteristics of the signal 105. In order to achieve this purpose, the estimator 120 carries out estimation of statistics in the time-frequency plane. The estimator 120 exploits both local and global correlations. Correlations exist both along frequency axis and along the time axis. The estimator 120 may, for example, employ one or two exemplary approaches. Approach I operates along the frequency axis for each block (i.e., exploits correlations along the frequency axis for a given block). Approach II operates along the time axis for each frequency subband; and therefore, it exploits correlations along time.

Figure 4:
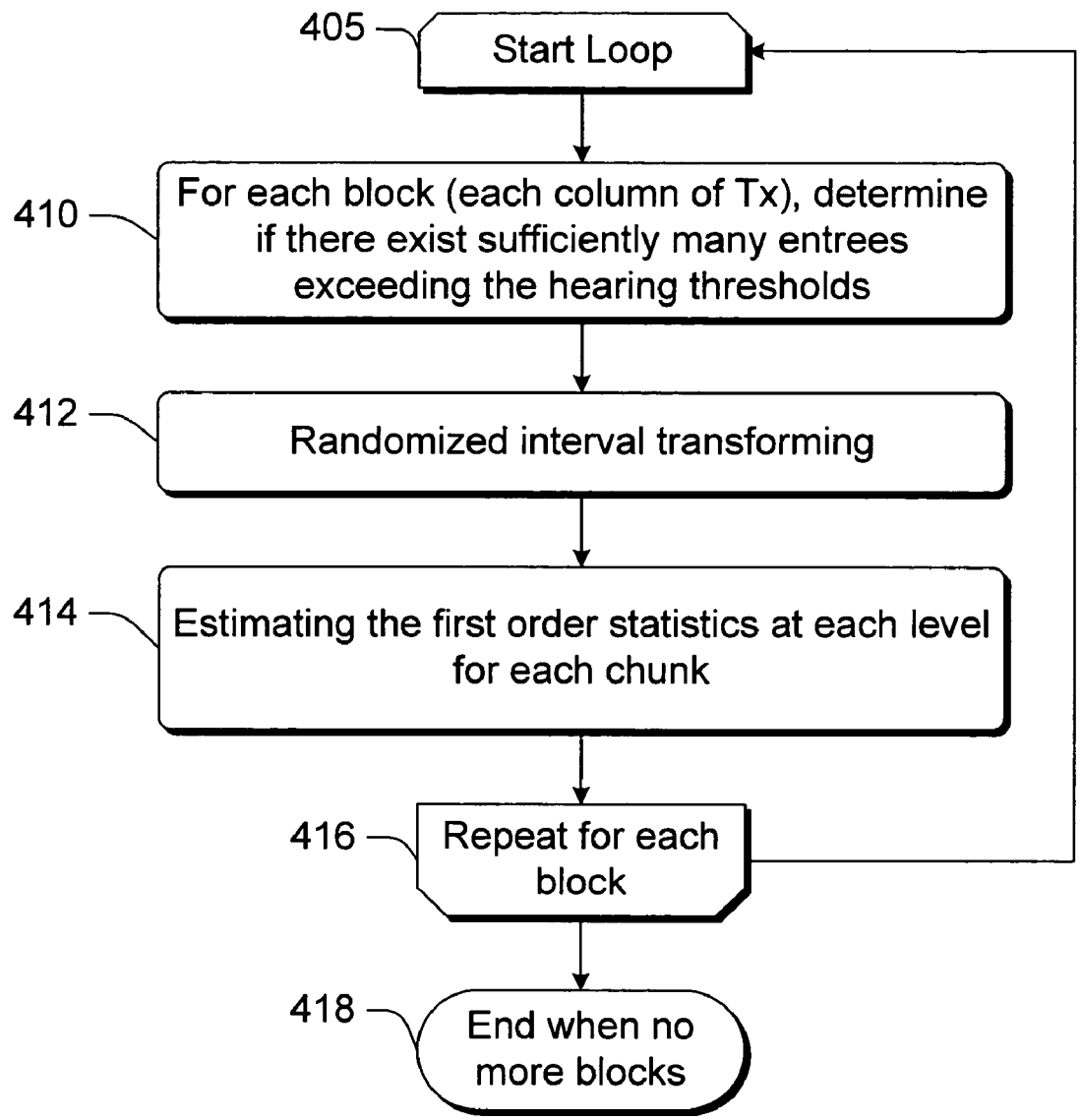
FIG. 4 is a flow diagram showing an illustrative methodological implementation of an implementation of the present invention claimed herein.

Methodological Implementations of Approach I and Approach II:

FIG. 4 show methodological implementations of both Approach I and Approach II, which is performed by the estimator 120 of the audio-content recognition system 100 (or some portion thereof). These methodological implementations may be performed in software, hardware, or a combination thereof.

The methodology of Approach II is very similar to Approach I. The main difference is that in Approach I correlations along frequency are exploited instead of correlation along time while in Approach II correlations along time are exploited instead of correlation along frequency.

At 410 of FIG. 4, for each block, the estimator 120 determines if there exist sufficiently many entrees exceeding the hearing thresholds. If not pass to the next block, else collect the "significant" coefficients into a vector of size $M' \leqq M$. More generally, the columns of $T_x$ are used in Approach I and the rows of $T_x$ are used in Approach II.

Figure 5A:
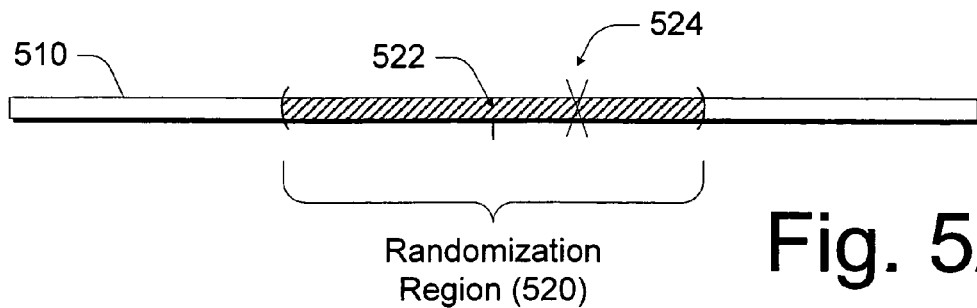
FIGS. 5A-5C illustrate some of the tasks performed by a statistic estimator in accordance with an implementation of the present invention claimed herein.

At 412, the estimator 120 performs a randomized interval transformation. FIG. 5A illustrates the concept of randomized "splitting" at a single level. At a single level of randomized splitting of a vector 510 (in either the frequency or time domain depending upon the Approach), first a randomization interval 520 (i.e., randomization region) is found that is to be symmetric around the midpoint 522. The ratio of the length of the randomization interval to the length of the whole vector 510 is the randomization tuning parameter for splitting. This may be a user-specified value.

Figure 5B:
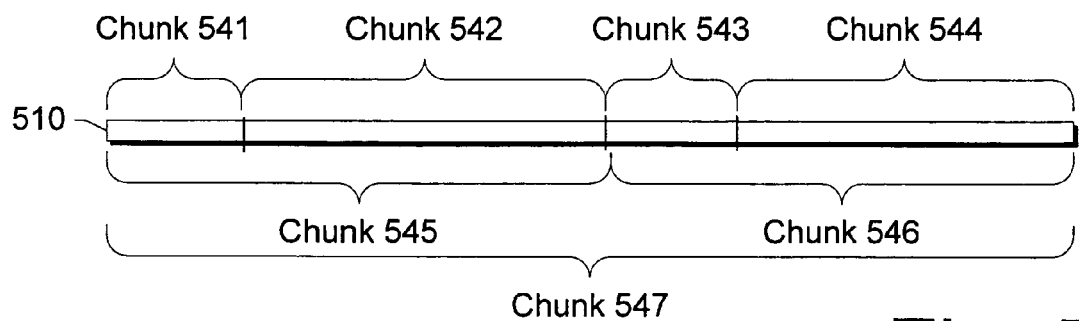

FIG. 5A shows that a random point 524 is chosen within this interval 520. This random point 524 is the point to do the splitting; as a result, two "chunks" are formed. Then this procedure is carried out a specified number of times—each time is a "level" of the splitting. The level is a function of M' and the expected number of coefficients desired within the smallest chunk. Hence, the expected number of coefficients that are within the smallest chunk is a user-specified parameter and determines the "level" for each block. As an example, in FIG. 5B, the recursive splitting is carried out twice, hence level=2.

At 414 of FIG. 4, the first order statistics at each level for each chunk are estimated once the split points are randomly found. As an example, consider FIG. 5B. At second level of splitting, there are a total of four chunks (chunks 541, 542, 543, 544), and the estimator 120 collects the arithmetic means of these four chunks (alternatively, other statistical values can be collected, such as variance). Then the estimator 120 proceeds to the first level of splitting, and the estimator 120 computes the arithmetic means at that level—namely, arithmetic means of chunks 545 and 456 in FIG. 5B). Finally, at the zeroth level, the estimator 120 performs the arithmetic mean computation for the whole vector 510 (namely, chunk 547). All of these arithmetic means are collected in a statistics vector.

At 416, the process returns back to the beginning of the loop at 405 and repeat the steps of blocks 410-416 until all blocks have be processed. After all blocks have been processed, the loop ends at 418.

Figure 5C:
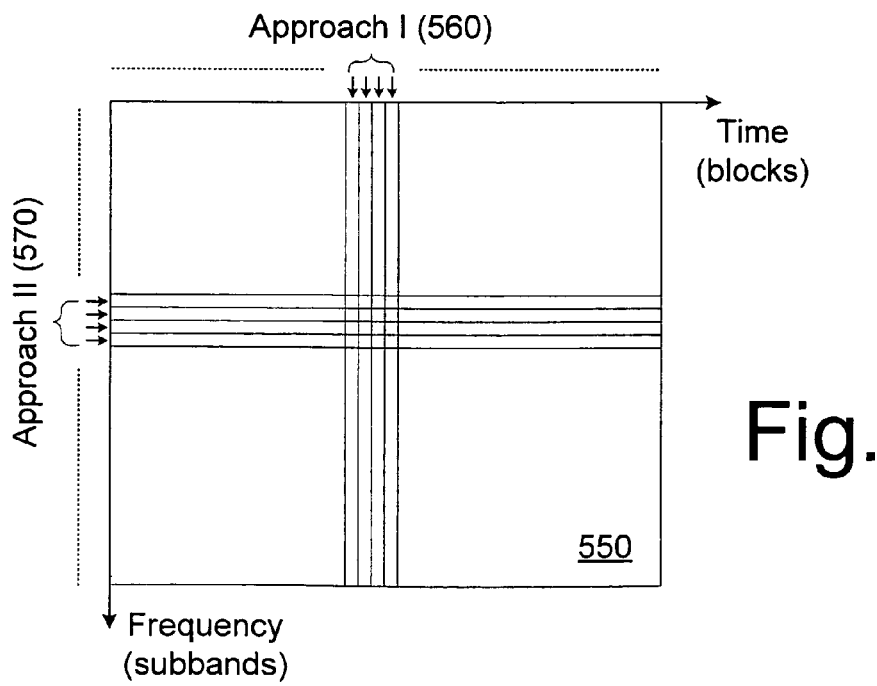

FIG. 5C illustrates the difference of Approach I 560 and Approach II 570 on the time-frequency representation 550 of an audio signal.

In Approach I, the estimator 120 estimates the statistics for each time block. With Approach I, the result of the estimator 120 is a statistics vector $\mu_f$ to denote the estimated means along the frequency axis.

In Approach II, the estimator 120 estimates the statistics for each frequency subband. With Approach II, the result of the estimator 120 is a statistics vector $\mu_t$ to denote the estimated means along the time axis.

Although both Approaches I and II of the exemplary embodiment are designed to estimate the first order statistics at this point, an alternative embodiment may include an estimation of any order statistics. In tests, it has been observed that first order statistics yield better results than second order statistics at this point. Regardless of which approach is employed (Approach I or II), the function of the adaptive quantizer 130 and the error correction decoder 140 is the same.

Another exemplary embodiment employs a third approach, Approach III, which combines Approaches I and II. In this approach, statistics are estimated based on random rectangles in the time-frequency plane. The shape of these rectangles may be adjusted to capture the appropriate characteristics.

Input Adaptive Quantization

The adaptive quantizer 130 produces discrete level of outputs given the statistics vector as the input. Meanwhile, the adaptive quantizer 130 effectively increases robustness properties of the hashing techniques (employed by the exemplary audio recognizer) and augments the amount of randomization.

In signal processing, the traditional way of producing discrete level of outputs from continuous level of inputs is termed as "quantization." Assume Q is the number of quantization levels (i.e., the cardinality of the set of discrete level of outputs). Also assume $\mu(j)$ denote the $j^{th}$ element of a given statistics vector $\mu$ and $\mu'(j)$ denote its quantized version. In conventional quantization schemes, the quantization rule is completely deterministic and given by $$\Delta_i \leq \mu(j) < \Delta_{i+1} \Rightarrow \mu'(j) = i, i = 0, 1, \ldots, Q-1,$$

where the interval $[\Delta_i, \Delta_{i+1})$ is termed as $i^{th}$ quantization bin. With the description herein of the exemplary embodiment, the focus is on the location of quantization bins rather than the reconstruction levels. In traditional quantization schemes in signal processing, the reconstruction levels are significant since quantization is usually applied as a part of a compression scheme. However, apart from the indexing issues, the reconstruction levels are not of significance for the exemplary embodiment described herein. Therefore, without loss of generality, the reconstruction levels are assumed to be given by integer indexes from the set $(0, 1, \ldots, Q-1)$.

Typically, the input statistics vector comes from a distribution that is highly biased at some points. To account for this "colored" nature of the statistics distribution, the exemplary embodiment employs an "adaptive quantization" scheme, which takes of possible arbitrary biases at different locations of the distribution of the statistics. In particular, the exemplary embodiment uses a normalized histogram of $\mu$ as the distribution of the statistics. A normalized histogram is usually very resistant against "slightly inaudible" attacks, thus such an adaptive scheme does not really bring a burden in terms of robustness. Furthermore, a normalized histogram approximates the p.d.f. (probability density function) of the marginal density functions of $\mu(j)$ are the same for all j, and the approximation error diminishes as the size of $\mu$ tends to in infinity. Thus, within the exemplary embodiment $\{\Delta_i\}$ is designed such that $$\int_{\Delta_{i-1}}^{\Delta_i} p_\mu(t) dt = \frac{1}{Q}, i = 0, 1, \ldots, Q-1.$$

where $p_\mu$ stands for the normalized histogram of the input statistic vector it. The intervals $[\Delta_i-1, \Delta_i)$ determine the quantization bins. Furthermore, define the "central points", $\{C_i\}$, such that $$\int_{\Delta_{i-1}}^{C_i} p_\mu(t) dt = \int_{C_i}^{\Delta_i} p_\mu(t) dt = \frac{1}{2Q}, i = 0, 1, \ldots, Q-1.$$

Now around each $\Delta_i$, we introduce a randomization interval $[L_i, U_i]$ such that $$\int_{L_i}^{\Delta_i} p_\mu(t) dt = \int_{\Delta_i}^{U_i} p_\mu(t) dt, i = 0, 1, \ldots, Q-1,$$

In other words, the randomization interval is symmetric around $\Delta_i$ for all i and we also impose the constraint that $C_i \leq L_i$ and $U_i \leq C_{i+1}$. The exact location of these randomization intervals are determined by "Randomization Factor", $$\text{Randomization Factor} = \frac{\int_{L_i}^{\Delta_i} p_\mu(t) dt}{\int_{\Delta_{i-1}}^{\Delta_i} p_\mu(t) dt}, i = 0, 1, \ldots, Q-1$$

where "randomization factor" is a parameter that determines the amount of randomization at the output of quantization and is a user-specified number that can clearly take values in the range $[0, \frac{1}{2}]$. This the p.d.f.-adaptive randomized quantization rule of the exemplary embodiment:

$$L_i \leq \mu(j) \leq U_i \Rightarrow \mu'(j) = \begin{cases} i \text{ with probability } \frac{\int_{L_i}^{\mu(j)} p_\mu(t) dt}{\int_{L_i}^{U_i} p_\mu(t) dt} \\ [i-1] \text{ with probability } \frac{\int_{\mu(j)}^{U_i} p_\mu(t) dt}{\int_{L_i}^{U_i} p_\mu(t) dt} \end{cases}$$

and $$C_i \leq \mu(j) \leq L_i \Rightarrow \mu'(j) = i-1 \text{ with probability } 1,$$

$$U_i \leq \mu(j) < C_{i+1} \Rightarrow \mu'(j) = i \text{ with probability } 1$$

Under such a randomized quantization rule, if $L_i \leq \mu(j) \leq U_i$, then $E[\mu'(j)] = \Delta_i$. This choice of the "Randomization Factor" offers a trade-off: As this factor increases, the amount of randomization at the output increases, which is a desired property; however, this also increases the chances of being vulnerable to attacks and modifications especially because in that case the security of the system relies, to a great extent, on keeping the randomization key as a secret. Thus, choosing a suitable range for "Randomization Factor" is a delicate issue. In the exemplary embodiment, a user-specified input parameter determines this issue. With such user-specified input parameter, the user may balance the degree of randomization desired against security concerns to achieve a customized result.

Error Correction Decoding

Once the exemplary embodiment has the quantized statistics, the next step is to convert these values into a binary bit stream (i.e., digital signal) and shorten the length of the overall stream in such a way that "perceptually same" audio clips are mapped to binary strings that are close to each other and "perceptually distinct" audio clips are mapped to binary strings that are far away from each other.

In order to achieve this purpose, the exemplary embodiment employs first order Reed-Müller codes at this point. Those who are skilled in the art understand and appreciate that other error correction schemes as well as possibly randomized Vector Quantization techniques may be employed and remain within the spirit and scope of the claimed invention.

Reed-Müller codes are a class of linear codes over GF(2) that are easy to describe and have an elegant structure. The generator matrix G for the first order Reed-Müller code of blocklength $2_m$ is defined as an array of blocks:

$$G = \begin{bmatrix} G_0 \\ G_1 \end{bmatrix}$$

where $G_0$ is a single row consisting of all ones and $G_1$ is a matrix of size m by $2_m$. $G_1$ is formed in such a way that each binary m-tuple appears once as a column. Thus, the resulting generator matrix is of size m+1 by $2_m$. More details on error correcting codes and Reed-Müller codes by found in *Theory and Practice of Error Control Codes* (1983) by R. Blahut.

Although there exist computationally efficient techniques for decoding with Reed-Müller codes (decoding with majority logic), the exemplary embodiment is using an exhaustive search on the input word space for the sake of simplicity. Unlike traditional decoding schemes that use Hamming distance as the error metric, the decoding scheme of the exemplary embodiment uses an error measure, which is termed as "Exponential Pseudo Norm" (EPN). It is more suitable than traditional error metrics (such as Hamming distance) for multimedia (image and audio) hashing problems.

Assume $\underline{x}_D$ and $\underline{y}_D$ are two vectors of length L such that each component of these vectors belongs to the set {0, 1, . . . , Q-1} where $\log_2 Q$ is a positive integer. Similarly, assume x and y are binary representations of the vectors $\underline{x}_D$ and $\underline{y}_D$ respectively, where each decimal component is converted to the binary format by using $\log_2 Q$ bits. The lengths of $\underline{x}$ and $\underline{y}$ are therefore going to be both L $\log_2$ Q. EPN is defined between the binary vectors $\underline{x}$ and $\underline{y}$ as $$EPN(x, y) \triangleq \sum_{i=1}^{L} K^{|x_D(i) - y_D(i)|},$$

where $x_D(i)$ and $y_D(i)$ denote the ith elements of the vectors $\underline{x}_D$ and $\underline{y}_D$ respectively. EPN ($\underline{x}$, $\underline{y}$) is actually a function of Q and K as well; however, for the sake of having a clean notation the exemplary embodiment are embedding these values in the expression and simply assuming that these values are known within the context of the problem.

Q is the number of quantization levels, and K is the "exponential constant" that determines how EPN penalizes large distances more. The results are approximately insensitive to the value of K if it is chosen to be large enough. Since part of the aim of the exemplary embodiment is to clearly distinguish between close and far values in the decimal representations of binary strings, EPN is suitable for incorporations into the hashing techniques of the exemplary embodiment.

Examples of methodological acts performed by the error correction decoder 140 are as follows:

Divide the quantized data into chunks of length that is user-specified.

Convert them into binary format by using $\log_2$ Q bits for each component, where Q is the number of quantization levels.

Form the generator matrix of first order Reed-Müller code where the length of the codewords is as close as possible to the length of the binary representation of the chunks.

For each possible input word (there are a total of $2^{m+1}$ possible input words for a generator matrix of size m+1 by $2^m$), generate the corresponding output word.

Find the EPN between each corresponding output word and the quantized data.

Pick up the input word that yields the minimum amount of EPN.

Methodological Implementation of the Exemplary Audio-Content Recognizer

FIG. 4 shows an illustrative methodological implementation of the exemplary audio-content recognizer performed (wholly in part) by the audio-content recognition system 100 (or some portion thereof). This methodological implementation may be performed in software, hardware, or a combination thereof.

Audio-Content Identification Methodological Implementation

Figure 6:
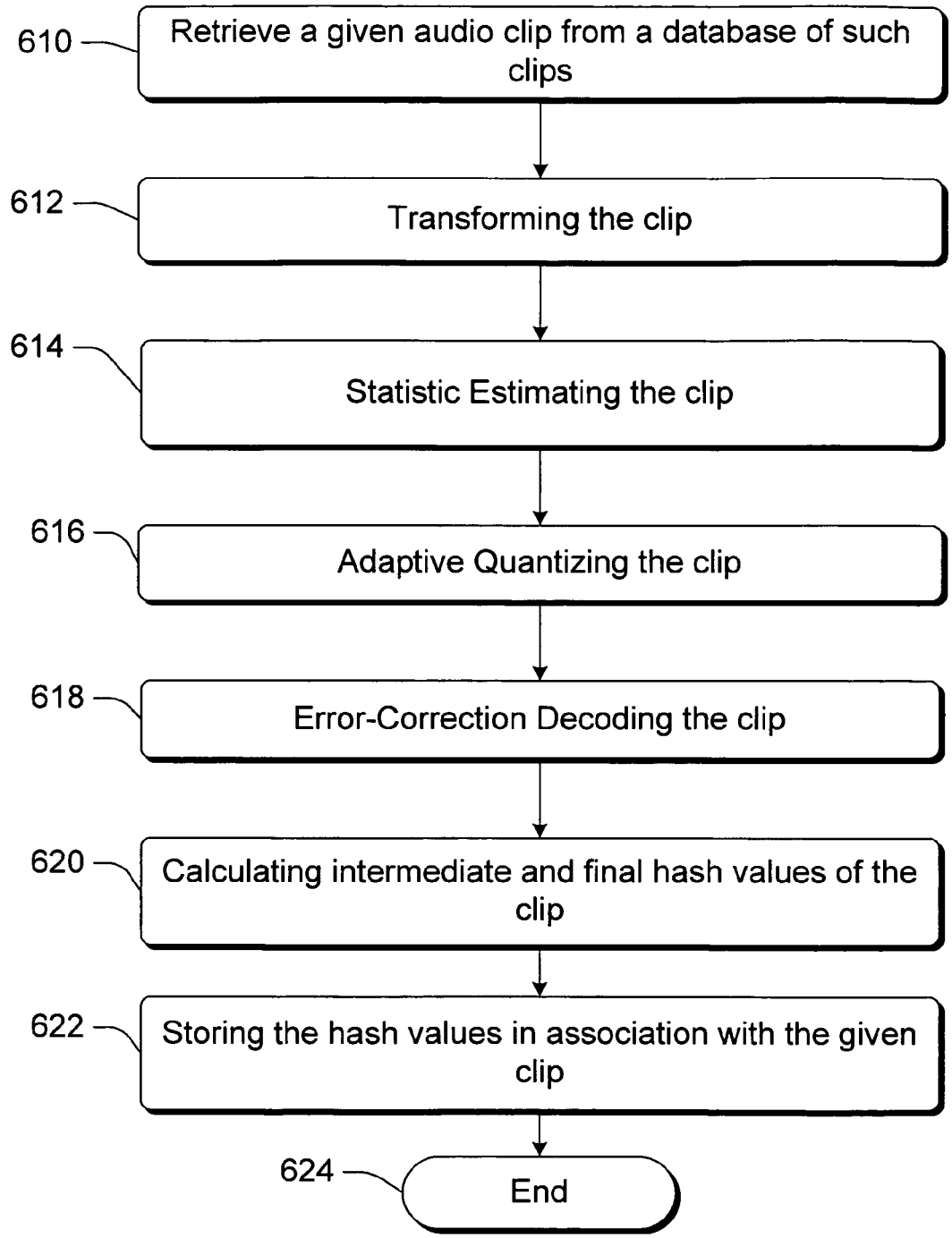
FIG. 6 is a flow diagram showing an illustrative methodological implementation of an implementation of the present invention claimed herein.

FIG. 6 illustrates an audio-content identification methodological implementation of the exemplary audio-content recognizer. At 610 of FIG. 6, the exemplary audio-content recognizer retrieves a subject audio clip from a database of audio clips or some other source of such audio signals. Once a subject clip is chosen, the exemplary audio-content recognizer, at 612, transforms it, in accordance with the transformation performed by the transformer 110, described above.

At 614 of FIG. 6, the exemplary audio-content recognizer estimates statistics of the transformed clip, in accordance with the estimation performed by the statistics estimator 120, described above. At 616, the exemplary audio-content recognizer adaptively quantizes the estimated statistics of the transformed clip, in accordance with the quantization performed by the adaptive quantizer 130, described above. At 618, the exemplary audio-content recognizer performs error-correction decoding on the results of the adaptive quantization, in accordance with the decoding performed by the decoder 140, described above.

At 620 of FIG. 6, it determines the hash values based upon the result of the above steps. The hash values include an intermediate hash value (i.e., categorization hash value) and a final hash value. These hash values are recognition representations of the audio content of the original audio clip. That is because these hash values may be used to recognize (and even identify) the audio content within an audio clip.

At 622 of FIG. 6, the resulting hash values are displayed and stored. These values are stored in a database in association with the original subject clip from which the values were calculated.

Piracy Detection Methodological Implementation

Figure 7:
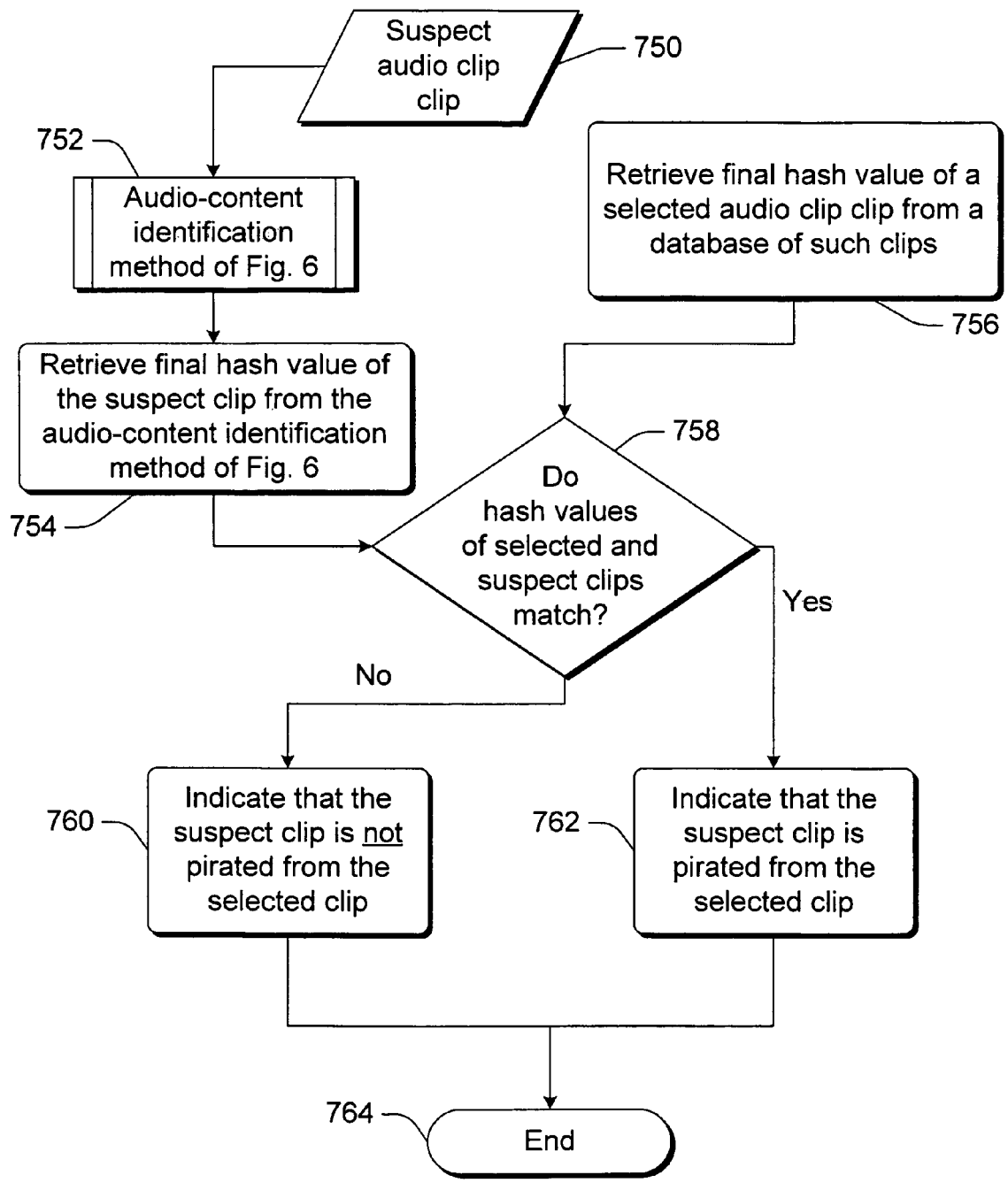
FIG. 7 is a flow diagram showing an illustrative methodological implementation of an implementation of the present invention claimed herein.

FIG. 7 illustrates a piracy detection methodological implementation of the exemplary audio-content recognizer. At 756 of FIG. 7, the exemplary audio-content recognizer retrieves a hash value of a selected audio clip. More particularly, it retrieves the final hash value (i.e., identification hash value) of such clip from a database of audio clips or some other source of such clips.

FIG. 7 also shows the audio-content identification method of FIG. 6 at block 752. The method 752 calculates a final hash value of an audio clip 750 that is suspected of being a copy of the selected clip retrieved by block 756. At 754, the exemplary audio-content recognizer retrieves the calculated final hash value of the suspect audio clip 750 from the audio-content identification method of block 752. Of course, this can be reversed so that the method 752 provides the hash value of the selected clip while block 752 provides the hash value of the suspected clip.

At 758, the exemplary audio-content recognizer compares the hash values of the two clips (suspect clip 750 and selected clip of 756) to determine if they substantially match. Substantially matching means that the two hash values are close enough in value to reasonably conclude that the two clips have the same hash values within a margin of error.

If the result of such comparison is no substantial match, then the exemplary audio-content recognizer indicates, at 760, that the suspect clip 750 is not a substantial copy of the selected clip of 756. In other words, no piracy is detected if the final hash values of compared clips do not substantially match. At 764, this process ends.

However, if the result of such comparison is a substantial match, then the exemplary audio-content recognizer indicates, at 762, that the suspect clip 750 is a substantial copy of the selected clip of 756. In other words, piracy is detected if the final hash values of compared clips substantially match. At 764, this process ends.

Audio Content Categorization Methodological Implementation

Figure 8:
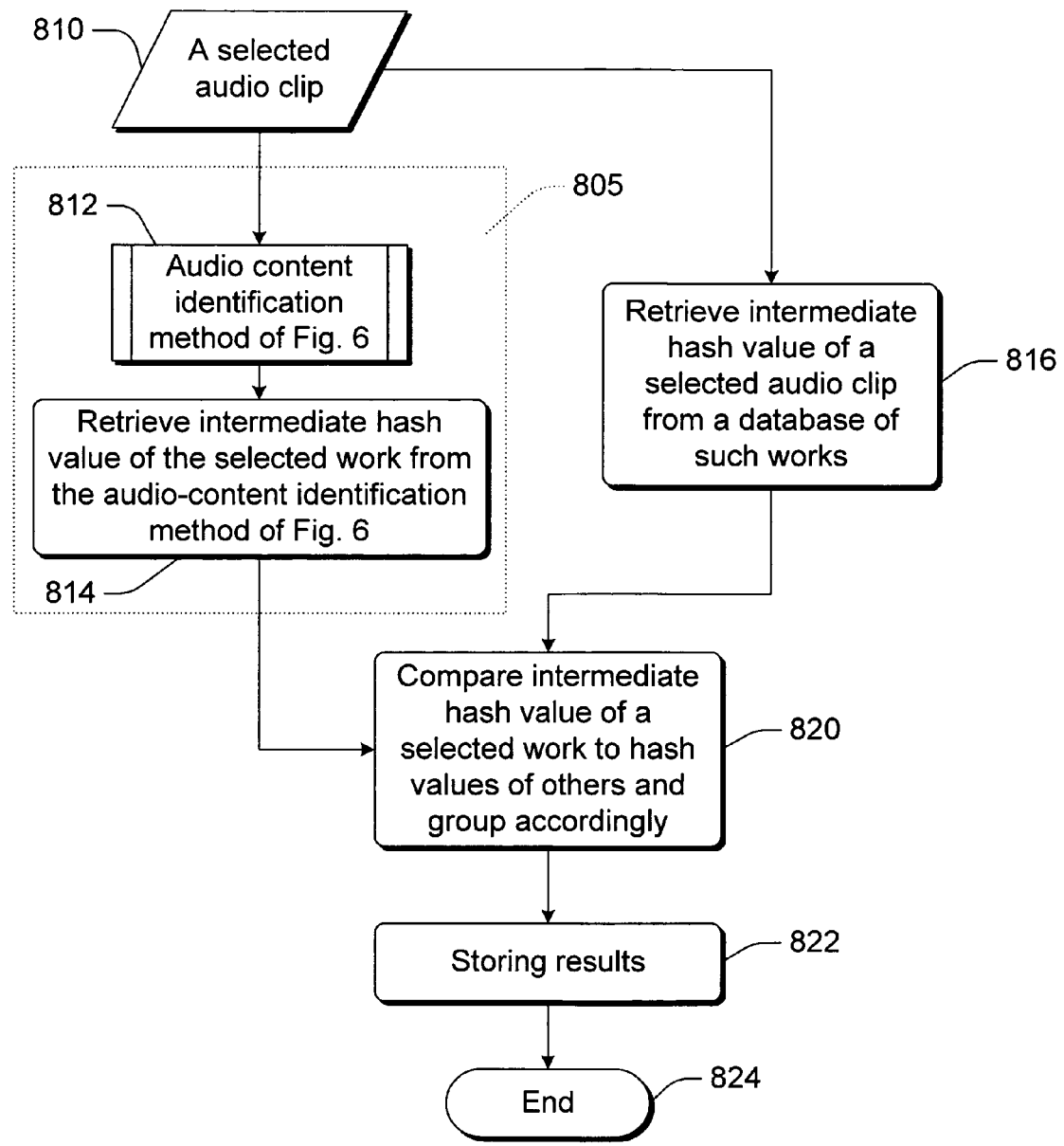
FIG. 8 is a flow diagram showing an illustrative methodological implementation of an implementation of the present invention claimed herein.

FIG. 8 illustrates an audio content categorization methodological implementation of the exemplary audio-content recognizer. At 816 of FIG. 8, the exemplary audio-content recognizer retrieves a hash value of a selected audio clip. More particularly, it retrieves the intermediate (i.e., categorization) hash value of such clip from a database of audio clips or some other source of such clips.

In dashed box 805, FIG. 8 also shows an alternative way of getting an intermediate hash value of the selected clip. This is by processing the clip using the audio-content identification method of FIG. 6 at block 812. The method 812 calculates an intermediate (i.e., categorization) hash value of the selected clip. At 814, the exemplary audio-content recognizer retrieves the calculated intermediate hash value of the selected audio content-base clip 810 from the audio-content identification method of block 812.

At 820, the exemplary audio-content recognizer uses the intermediate hash value of the selected clip to group such clip with others of similar (i.e., proximal) intermediate hash values. In other words, based upon the intermediate hash value of a given clip, the exemplary audio-content recognizer groups the given clip with other clips having similar intermediate hash values. Thus, the hash values of all clips in a given grouping are clustered together (i.e., proximal each other). Although these groupings are somewhat objectively determined, the subjective nature of the content of clips within a grouping will be similar to that of the content of others within the grouping.

The exemplary audio-content recognizer uses the categorization hash value of the selected clip to group such clip with others of similar (i.e., proximal) categorization hash values. In other words, based upon the categorization hash value of a given clip, the exemplary audio-content recognizer groups the given work with other works having similar categorization hash values. Thus, the hash values of all works in each grouping are clustered together (i.e., proximal each other). Although these groupings are primarily objectively determined, the subjective nature of the content of works within a grouping will be similar to that of the content of others within the grouping.

The boundaries between groupings are determined manually or automatically. Manually, a person selects the boundary between groupings using the natural clustering seen after many clips have been categorized. Automatically, a system mathematically selects the boundary between groupings to be some point between (perhaps halfway) the centers of the groupings. Of course, other such techniques may to used to determine boundaries. These techniques may be fully automatic, fully manual, or some combination.

At 822, the exemplary audio-content recognizer stores the categorization results in a database. At 824, the process ends.

Exemplary Computing System and Environment

FIG. 9 illustrates an example of a suitable computing environment 900 within which an exemplary audio recognizer, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary audio recognizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary audio recognizer may be described in the general context of computer-executable instructions, such as program modules, being executed by a computer. Generally, program modules include routines, programs, objects, components, data structures, etc. that perform particular tasks or implement particular abstract data types. Exemplary audio recognizer may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a digital audio signal hashing unit, a watermark encoder, transformer, a statistics estimator, an adaptive quantizer, an error-correction decoder, and a hasher.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary audio recognizer may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 9 illustrates an example of a suitable operating environment 900 in which an exemplary audio recognizer may be implemented. Specifically, the exemplary audio recognizer(s) described herein may be implemented (wholly or in part) by any program modules 928-930 and/or operating system 928 in FIG. 9 or a portion thereof.

The operating environment is only an example of a suitable operating environment and is not intended to suggest any limitation as to the scope or use of functionality of the exemplary audio recognizer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary audio recognizer may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific towards digital audio signals, it is to be understood that the invention defined in the appended claims is not necessarily limited to digital audio signals. Rather, it may apply to other digital signals (e.g., images, multimedia, video, film, data, information, text, etc.).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented watermarking method, comprising:
    computing a hash value representative of a digital signal, wherein the computing comprises:
        transforming the digital signal into a digital signal transform;
        randomly dividing the digital signal transform into multiple chunks, each chunk containing signal data, wherein the dividing is carried out recursively to form hierarchical levels of overlapping chunks; and
        averaging, for each of the chunks, the signal data to produce corresponding chunk averages;
        generating, based in part on the chunk averages, an exponential distribution having multiple distinct quantization levels;
        randomly rounding each of the chunk averages to one of the quantization levels to produce rounded values; and
        hashing a composite of the rounded values; and
    watermarking the digital signal with a watermark derived, at least in part, from the hash value.

2. A computer-implemented watermarking method as recited in claim 1, wherein the hash value is representative of the digital signal based upon intrinsic characteristics of the digital signal, wherein perceptually distinct digital signals have computed hash values that are approximately independent of one another and perceptually same digital signals have computed hash values are substantially identical.

3. A computer-implemented watermarking method as recited in claim 1 further comprising transmitting the now-watermarked digital signal via a communications network.

4. A computer-implemented watermarking method as recited in claim 1 further comprising storing the now-watermarked digital signal.

5. A computer-implemented watermarking method as recited in claim 1, wherein the digital signals are selected from a group consisting of digital audio signals, digital video signals, digital image signals, and digital multimedia signals.

6. A system comprising a processor, a memory, and means for performing functions comprising:
    computing by the processor a hash value representative of a digital signal, wherein the computing comprises:
        transforming the digital signal into a digital signal transform;
        randomly dividing the digital signal transform into multiple chunks, each chunk containing signal data, wherein the dividing is carried out recursively to form hierarchical levels of overlapping chunks and averaging, for each of the chunks, the signal data to produce corresponding chunk averages;

generating, based in part on the chunk averages, an exponential distribution having multiple distinct quantization levels;

randomly rounding each of the chunk averages to one of the quantization levels to produce rounded values; and hashing a composite of the rounded values; and watermarking by the processor the digital signal with a watermark derived, at least in part, from the hash value.

7. A system as recited in claim 6, wherein the hash value is representative of the digital signal based upon intrinsic characteristics of the digital signal, wherein perceptually distinct digital signals have computed hash values that are approximately independent of one another and perceptually same digital signals have computed hash values are substantially identical.

8. A system as recited in claim 6, the functions further comprising transmitting the now-watermarked digital signal via a communications network.

9. A system as recited in claim 6, the functions further comprising storing the now-watermarked digital signal.

10. A system as recited in claim 6, wherein the digital signals are selected from a group consisting of digital audio signals, digital video signals, digital image signals, and digital multimedia signals.

11. One or more computer-readable storage media having computer-executable instructions thereon that, when executed by a computer, perform acts comprising:

computing by the computer a hash value representative of a digital signal, wherein the computing comprises:

transforming the digital signal into a digital signal transform;

randomly dividing the digital signal transform into multiple chunks, each chunk containing signal data, wherein the dividing is carried out recursively to form hierarchical levels of overlapping chunks;

averaging, for each of the chunks, the signal data to produce corresponding chunk averages;

generating, based in part on the chunk averages, an exponential distribution having multiple distinct quantization levels;

randomly rounding each of the chunk averages to one of the quantization levels to produce rounded values; and hashing a composite of the rounded values; and watermarking by the computer the digital signal with a watermark derived, at least in part, from the hash value.

12. One or more computer-readable storage media as recited in claim 11, wherein the hash value is representative of the digital signal based upon intrinsic characteristics of the digital signal, wherein perceptually distinct digital signals have computed hash values that are approximately independent of one another and perceptually same digital signals have computed hash values are substantially identical.

13. One or more computer-readable storage media as recited in claim 11 further comprising transmitting the now-watermarked digital signal via a communications network.

14. One or more computer-readable storage media as recited in claim 11 further comprising storing the now-watermarked digital signal.

15. One or more computer-readable storage media as recited in claim 11, wherein the digital signals are selected from a group consisting of digital audio signals, digital video signals, digital image signals, and digital multimedia signals.

* * * * *

UNITED STATES PATENT AND TRADEMARK OFFICE
CERTIFICATE OF CORRECTION

PATENT NO. : 7,657,752 B2  Page 1 of 1
APPLICATION NO. : 10/980907
DATED : February 2, 2010
INVENTOR(S) : Mehmet Kivanc Mihcak et al.

It is certified that error appears in the above-identified patent and that said Letters Patent is hereby corrected as shown below:

On the Title Page, item (54); change

"Digital Signal Watermaker" to -- Digital Signal Watermarker --.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,657,752 B2
APPLICATION NO. : 10/980907
DATED : February 2, 2010
INVENTOR(S) : Mehmet Kivanc Mihcak et al.

It is certified that error appears in the above-identified patent and that said Letters Patent is hereby corrected as shown below:

On the Title Page, item (54) and at Column 1, line 1, the title; change "Digital Signal Watermaker" to -- Digital Signal Watermarker --.

This certificate supersedes the Certificate of Correction issued March 30, 2010.

Signed and Sealed this

Twenty-seventh Day of April, 2010

David J. Kappos
*Director of the United States Patent and Trademark Office*